United States Patent [19]
Plumat et al.

[11] 3,905,791
[45] Sept. 16, 1975

[54] METHOD FOR MAKING COLORED TRANSPARENT ARTICLES

[75] Inventors: Emile Plumat, Gilly; Jean Schottey, Montignies-sur-Sambre; Francois Toussaint, Montignies-le-Tilleul, all of Belgium

[73] Assignee: Glaverble-Mecaniver, Watermael-Boitsfort, Belgium

[22] Filed: Mar. 28, 1974

[21] Appl. No.: 455,952

[30] Foreign Application Priority Data
Apr. 2, 1973 Luxemburg.............................. 67338

[52] U.S. Cl....................... 65/30; 65/32; 204/195 R
[51] Int. Cl.²............................................ C03C 17/26
[58] Field of Search................ 65/30, 32; 204/195 R

[56] References Cited
UNITED STATES PATENTS

| | | | |
|---|---|---|---|
| 3,393,987 | 7/1968 | Plumat................................... | 65/30 |
| 3,486,995 | 12/1969 | Evers................................... | 65/30 X |
| 3,615,321 | 10/1971 | Carruth................................... | 65/30 |
| 3,650,720 | 3/1972 | Grego................................... | 65/30 |
| 3,674,454 | 7/1972 | Plumat et al........................... | 65/30 |

*Primary Examiner*—Robert L. Lindsay, Jr.
*Attorney, Agent, or Firm*—Spencer & Kaye

[57] ABSTRACT

In the coloring of bodies of glass by diffusion of coloring ions from a treatment medium into surface layers thereof, the repeatability of the resulting coloration is improved by controlling not only the treatment temperature and composition of the medium and the treatment time, but also by controlling the electrical potential within the medium between a pair of electrodes in contact therewith. Preferably, for electrodes of specified composition and structure, this potential is maintained at a value between −600 mV and +300 mV.

18 Claims, 3 Drawing Figures

3,905,791

METHOD FOR MAKING COLORED TRANSPARENT ARTICLES

BACKGROUND OF THE INVENTION

This invention relates to a process of forming a glass body from a vitrifiable batch and coloring, or modifying the color of, such body by causing a substance to diffuse into surface layers of the glass body from a contacting medium. The invention also relates to glass articles formed and colored by such process.

Colored glass bodies can be made by forming them from a vitrifiable batch incorporating appropriate coloring compounds. This procedure is practicable in but a limited number of circumstances due to the need to use a different batch composition for every different glass color to be produced. In the glass manufacturing industry and in particular in the production of flat glass it is usually much more practicable to color the glass body after its formation so that the coloring treatment can be controlled independently of the production of the vitrifiable batch and of the glass forming process.

A known process for coloring glass involves the diffusion of coloring substance into the glass at an elevated temperature. In this way the glass can be colored to a certain depth below its surface and the color cannot be removed simply by scratching the glass surface.

A coloring element which is of particular interest for various purposes is silver. Glass sheets having a yellow or yellow to brown coloration due to the presence of silver which has diffused into the glass can be used for example for glazing purposes to achieve a certain aesthetic effect or to screen off ultraviolet or short wave visible light.

The coloration of glass by silver diffusion is a process which has been found to be subject to haphazard, uncontrollable variations on account of which given results cannot be reproduced within required limits of accuracy without a considerable amount of expensive experimentation.

In a diffusion type coloration process the glass is contacted with a treatment medium providing coloring ions which diffuse into the glass.

It has been the belief that such process could be repetitively performed to color a plurality of glass bodies without causing inadmissible differences in coloration from one body to another by keeping the composition of the treatment medium reasonably constant. However, experiments with silver ion diffusion have shown that when a process is repeated after an interval of time using a treatment medium prepared to the same specifications as before, and observing the same temperature, treatment time and treatment procedure as on the first occasion, there is often a marked disparity in the results. This phenomenon remains unexplained.

Attempts to remedy this disparity by modifying the composition of the treatment medium or the treatment time or temperature afforded no satisfactory solution, the effects being too uncertain to make these expedients practicable. These circumstances have hitherto prevented the industrial application of a silver diffusion process where product quality control is important.

SUMMARY OF THE INVENTION

It is a principal object of the present invention to provide a process by which glass coloration due to silver ion diffusion can be brought about and which can be more easily repeated to reproduce the same or substantially the same results, when judged in terms of the resulting glass color.

A further object of the invention is to provide a process which can be precisely controlled to cause predetermined coloration of glass while leaving processing conditions which are of importance for reasons other than the coloration of the glass unchanged.

These and other objects are achieved according to the present invention by a process of forming a glass body from a vitrifiable batch and coloring or modifying the color of such body by causing a substance to diffuse into surface layers of the glass body from a contacting medium, in which, during or after forming the glass body, a reducing agent is introduced into the surface of the body; a treatment medium is prepared which comprises (i) at least one salt yielding reducible silver ions capable of being reduced by the reducing agent, and (ii) a diluting agent constituted by one or more salts of another metal or metals, such medium being formulated in dependence on electrical potential measurements so that the medium has an electrical potential of between —600 and +300 mV; and the body into which the reducing agent has been introduced is contacted with such medium, while the electrical potential of the medium is in such range, under temperature conditions such that reducible silver ions diffuse from the medium into said body and at least some of such ions are reduced in the body by the reducing agent.

The "electrical potential" of the treatment medium is defined as the voltage between two electrodes associated with the medium, such association involving, for example, immersion of the electrodes in the mixture of molten salts. One of the electrodes is formed by a platinum wafer or wire, the other electrode being a reference electrode. A millivoltmeter placed between these two electrodes enables the potential difference between them to be evaluated.

The reference electrode used must be stable for the entire treatment period so that the same electrical potential conditions can be reproduced in further performances of the process.

It is possible to use a reference electrode composed of a borosilicate glass container holding a quantity of silver nitrate and potassium nitrate in which a silver plate serving as electrical contact is suspended, such reference electrode being immersed in the treatment medium to constitute the following system, identifying the path traversed by the current associated with the electric potential:

Ag-AgNO$_3$ 0.1 molal in KNO$_3$-borosilicate-treatment medium.

Such an electrode however does not have a satisfactory life. Its potential grows in the course of time so that measurements cannot be continued beyond a few weeks, or even a few days, unless its drift is compensated for.

It is preferable to use a sulphate reference electrode which retains a stable potential for a much longer period. This electrode presents the following electric field system:

Ag-Ag$_2$SO$_4$ 0.1 molal in $\begin{Bmatrix} K_2SO_4\ 36.1\% \\ Na_2SO_4\ 19.3\% \\ ZnSO_4\ 44.6\% \end{Bmatrix}$ - borosilicate - treatment medium.

The reference electrode is constituted by a tube of borosilicate glass such as that sold under the trademark Pyrex having an external diameter of 12 mm and closed at one end. This tube contains the silver sulphate solution. Within the solution is immersed a silver plate of 0.5 cm² area, which plate is fastened to the end of a second "Pyrex" tube with a diameter of 5 mm, through which runs a silver connecting wire of 0.5 mm diameter, which wire is connected to the voltmeter.

The reference electrode must be made of the same type of "Pyrex" glass, during all the control measures and for example use may be made of the "Pyrex-France" type of Pyrex glass made by Sovirel. The open end of the electrode holding the salt mixture may be closed by sealing the glass or may be maintained above the treatment bath level.

The electrical potential values referred to in this specification are potentials determined by using such a sulphate reference electrode.

The operating conditions above and hereinafter referred to enable the electrical potential of the treatment medium to be determined with an accuracy of ± 5 mV.

The present invention affords important advantages, the first and most important of which is that it is a relatively easy matter, by a repetition of the process at any time, to bring about the coloration of further glass bodies so that they comply within reasonably narrow limits to the same color standard. When working within the electrical potential range of −600 to +300 mV in accordance with the present invention, the electrical potential becomes a control parameter so that in repetitive performance of the process, the successively treated glass bodies are given equivalent properties by keeping known influential parameters such as the treatment time and temperature and the silver ion concentration substantially the same for the different performances of the process and relying on control of the electrical potential of the treatment medium as the control parameter.

The process can be performed on a succession of glass bodies using the same body of treatment medium. In that case, although the silver ion concentration of the treatment medium must of course be made up from time to time to compensate for silver ion consumption and so avoid long term variations in the coloration results, haphazard short term variations which hitherto arose for unidentified reasons can be avoided.

The invention can likewise be performed repetitively for coloring different bodies at any required intervals of time using, on the different occasions, different bodies of treatment medium of the same apparent composition. In that case the results of the successive performances of the process with the successive bodies of treatment medium are quite easily repeated.

It is to be understood however that variations in influencing factors other than the electrical potential, as between one performance of the method and another are not excluded. In other words, by using the electrical potential as a control parameter within the specified range, it is possible to achieve results matching those obtained in an earlier performance of the process according to the invention even if there is a difference between the different process runs in respect to the silver ion concentration in the treatment medium and/or the treatment time and/or the treatment temperature.

When working under industrial conditions, the most practical procedure is to keep the aforesaid other influencing factors the same or substantially so and to rely on adjustment of the electrical potential of the medium within the specified range in order to obtain the required result.

If desired, the electrical potential of the treatment medium can be caused to vary during any given performance of the process, in a way which is controlled and recorded during the treatment period. In a subsequent performance of the process for coloring another glass body, the electrical potential of the treatment medium can then be caused to vary according to a similar program in order to reproduce the coloration of the previously colored body.

On the other hand it is usually preferable for the electrical potential of the treatment medium to be kept substantially constant within the specified range during any one performance of the process, i.e., during the performance of the process for coloring one glass body or for coloring two or more glass bodies simultaneously using the same body of treatment medium. The process can then be more easily reproduced because in a subsequent performance of it, using a treatment medium of the same apparent composition, a similar glass coloration can be achieved by keeping the electrical potential of the medium within the specified range at a value which is likewise constant. Normally the required coloration will be reproduced if that electrical potential value is the same as the value of the electrical potential of the medium used in the preceding performance of the process. However, it is to be understood that an adjustment of the electrical potential to a somewhat higher or lower value can easily be made should that prove to be necessary.

By carrying out a process according to the invention, wherein glass is colored due to the diffusion into the glass of silver ions which become reduced in the glass by reducing agent already present therein, it is possible to achieve a coloration such that the glass has light-transmitting properties making it very suitable for various purposes, in particular as a glazing material in situations where it is desirable to screen off rays in a well defined region at the shorter wavelength end of the visible spectrum and in the ultraviolet region. In the industrial production of such glazing materials it is of course very important for reproducible results to be obtainable.

Another advantage of the invention is the fact that the specified colorations of glass can be brought about with a relatively low consumption of silver. This of course has a favorable effect on the price of the products. The low silver consumption is made possible by the use of a diluting agent in the treatment medium. The inclusion of a diluting agent in the treatment medium is a step which breaks away from prior teaching relating to the diffusion of coloring substance into glass, which teaching has assumed it to be necessary for the treatment medium to consist essentially of the compound yielding the required ions.

Having regard to the foregoing it will be apparent that the advantages associated with the process according to the invention are due to a combination of factors, namely the presence of reducing agent in the glass body prior to the diffusion of silver ions into the glass, the use of a treatment medium containing a diluting agent and, of particular importance, the use of a medium with an electrical potential within the range hereinbefore specified.

Advantageously the electrical potential of the treatment medium is between − 300 and + 100 mV during the treatment of the glass body. When working within that range, the result achieved in terms of the coloration of the glass can be more accurately reproduced in a subsequent process run because within that range the effect of the treatment on the color of the glass tends to be more significantly affected by the electrical potential of the medium.

by observing the lower limit of − 300 mV there is less risk of affecting the glass in such a way that it becomes susceptible to chemical attack by pollutants in the atmosphere and more susceptible to iridescence. Resistance to chemical attack is of importance for glass bodies, e.g. glazing panels, which are to be exposed for long periods of time to a polluted environment. The resistance of the glass to iridescence is an important factor aesthetically, and is of particular importance in the case of glass to be used in vehicle windows and in vehicle windscreens. By keeping the electrical potential below + 100 mV one avoids problems of treatment medium alterations.

According to certain very important embodiments of the invention, the electrical potential of the treatment medium is in the range − 100 to + 50 mV during the treatment of the glass body. Such embodiments possess the advantage that for any given composition of the treatment medium and any given treatment time and temperature, the observance of the electrical potential range − 100 to + 50 mV enables the maximum color purity to be obtained. It is very suitable to work within the said range − 100 to + 50 mV when treating glass to be used as glazing panels for vehicles, or components of such panel.

Special importance is also attached to embodiments of the invention in which the electrical potential of the treatment medium is in the range + 50 to + 100 mV during the treatment of the glass body. Glass bodies which have been treated by such processes show a high luminance and still a fairly good color purity. Such processes are therefore also of particular importance in the production of high performance glazing panels. It is also very suitable to work within the range + 50 to + 100 mV when treating glass to be used in black and white television tubes or tubular fluorescent lamps.

In both of the aforesaid ranges − 100 to + 50 mV and + 50 to 100 mV one obtains glass bodies which have a narrow light absorption peak at a location in the shorter wavelength end of the visible spectrum. The narrowest peaks are obtained at potentials in the range of + 50 mV to + 100 mV.

The process according to the invention may be performed using a treatment medium in the form of a paste. However the medium is preferably composed entirely or substantially entirely of molten salts. With such a medium it is easier to achieve a uniform coloration of the glass body.

The molten medium may be sprinkled on the article, but it is preferable to immerse the latter in the molten medium because under those conditions it is easier to control the electrical potential.

The invention is not limited to processes in which the entire surface of the body is colored. The invention includes processes in which only part of the surface of the body is colored, for example one surface of a body in the form of a flat or curved sheet. If only a portion of the surface of the body is required to be colored, the body may be immersed in the medium with the remainder of the surface masked. Alternatively, when the shape of the body so permits, the required result may be achieved by immersing only that part of the body which is to be colored.

According to preferred embodiments of the invention, the treatment medium contains one or more silver compounds in a concentration or aggregate concentration of less than 100 ppm (parts per million. Such a process may be performed at relatively low cost and yet enables colored glass bodies to be obtained which are useful on account of their physiological and/or decorative effects, for example in the motor vehicle and building industries.

Depending upon the silver ion concentration in the treatment medium and the value of the electrical potential of this medium, it is generally possible to obtain the colorations required for any particular purpose in a treatment period ranging between a quarter of an hour and 120 hours using treatment temperatures of between 400° and 540°C. These treatment conditions are cited only by way of example. Treatment temperatures and times substantially different from those mentioned may be adopted if required.

The salt or salts forming the diluting agent in the treatment medium may perform a function additional to that of acting as diluting agent. For example, the diluting agent may comprise a salt which yields metallic ions which diffuse into the body in exchange for other ions, so as to bring about some other modification of the surface properties of the body.

In certain processes according to the invention, the diluting agent yields metallic ions which diffuse into the body in exchange for smaller ions and such a diffusion takes place at a temperature such that surface compressive stresses are induced in the body, which stresses cannot completely relax during the treatment. The body is thus chemically tempered and in consequence has increased breaking strength in respect of tensile stresses.

In such a chemical tempering treatment the diluting agent preferably provides potassium ions which diffuse into the body in exchange for smaller sodium ions. The exchange preferably takes place at a temperature below the strain point of the glass.

According to certain important embodiments of the invention the diluting agent is entirely, or for the most part, composed of potassium nitrate and the remainder of the treatment medium is entirely, or for the most part, composed of silver nitrate. Such a medium is particularly effective for causing coloration and chemical tempering to be brought about in a single operation.

Special mention is made of processes according to the invention in which the glass body is initially colorless, surface compressive stresses are induced in the body as above referred to, and the electrical potential of the treatment medium is controlled so that at the completion of the treatment which brings about coloration of the body by silver, the body has a light transmitting characteristic presenting an absorption band which is centered on a wavelength between 405 and 435 m$\mu$ and has a width at mid-height of not more than 150 m$\mu$. Such processes are very important because the resulting bodies have a combination of properties which make them very well suited for use where a good screening effect with respect to radiation which is harmful to the eyes, and a relatively high light transmission, are important. Such bodies not only have those properties but also a relatively high mechanical strength due to the compressive surface stresses in the body. Bodies in sheet form produced by such processes are very suitable for use as glazing material in buildings and vehicles.

Preferably the electrical potential of the treatment medium and the duration of the treatment are such that at the end of the treatment the body has a luminance greater than 70%.

At such luminance values, the colored body provides a high level of visual acuity which is particularly important in the case of colored bodies in sheet form to be used as glazing material with high performance specifications, e.g. as vehicle windshields or as components therefor.

In certain processes according to the invention the electrical potential of the treatment medium and the duration of the treatment are such that at the end of the treatment the body has a luminance greater than 80 percent. The optical performance of such bodies is particularly high.

According to certain embodiments of the invention, the treatment medium contains a carbonate. The presence of carbonate in this medium is helpful to the attainment of electrical potential values within the preferred ranges hereinbefore referred to, and to the stabilization of the electrical potential of the medium. In some cases, a treatment medium which does not have the required electrical potential can be brought to that potential merely by adding a carbonate, but in other cases the use of other means in addition to the use of a carbonate is essential.

It has been found that it is possible to bring the electrical potential of the treatment medium to within a required electrical potential range and to keep the potential in that range by adding various classes of compounds such as, for example, pyrosulphates and bichromates. By the use of such additives, a medium formed mainly by molten nitrates, for example, can be brought to a positive potential. However, in certain processes according to the invention, wherein the electrical potential control is more flexible, the electrical potential of the medium is influenced by bringing one or more gases, such as $CO_2$, $SO_2$, $NO_2$ and nitric acid vapors, into contact with the medium. By using one or more of such gases, it is possible to bring the potential of the treatment medium to a predetermined value and keep it at such value. Moreover when the treatment medium used is in the form of a mixture of molten salts, the use of one or more of such gases can promote the uniformity of the treatment. For example when use is made of a bath of molten salts as the treatment medium, the gas or gases can be injected into the bath, thus bringing about some agitation of the bath which is favorable to the achievement of a uniform coloration of the glass body.

In some processes according to the invention use is made of one or more of such gases mixed with oxygen. In such processes the gas mixture influences the electrical potential of the medium and the influence exerted is dependent on the properties of oxygen in the mixture. In order to influence the electrical potential of the treatment medium, all that is required is to entrain the $SO_2$, $CO_2$ or other gas in air and to vary the proportion of air in the mixture. By way of example the electrical potential of a bath composed mainly of molten nitrates can be maintained at any desired value between $-150$ mV and $+100$ mV by injecting $NO_2$ mixed with air in appropriate proportions into the bath.

In carrying out a process according to the invention a reducing agent is introduced into the body of glass during or after its formation. The invention can be performed starting with glass of ordinary composition. In the most important applications of the invention, the body is formed from soda-lime glass of ordinary composition. Such glasses are substantially colorless and in their treatment by a process according to the invention they are given a coloring which is determined solely by such process. The reducing agent is introduced into the surface layers of the glass body and is accordingly concentrated where the coloration is to take place. The reducing agent may, for example, comprise ions of a single element or ions of more than one element. For example, reducing ions may be introduced by causing them to diffuse into the surface of the body from a contacting medium.

Advantageously, the reducing agent is introduced into the surface of the body during its formation.

The invention has been found very useful for coloring flat soda-lime glass and shaped bodies formed from flat soda-lime glass. The problem of coloring such bodies in a predetermined, precisely controlled and reproducible manner frequently arises in industry, for example in the manufacture of flat or curved glazing panels, both for buildings and motor vehicles or glass for eyeglass lenses. The invention may, for example, be successfully used to color soda-lime flat glass formed by drawing molten glass in a continuous ribbon through a drawing chamber and a contiguous vertical annealing tower as is done in the conventional Pittsburgh type drawing process, or through a drawing chamber and a contiguous horizontal annealing lehr, as is done in the conventional Libbey-Owens drawing process. When applying the invention to drawn glass, the reducing agent may, for example, be introduced into the glass while it is being drawn, for example in the drawing chamber.

In the most important processes according to the invention the reducing agent is caused to diffuse into the glass body from a mass of material of higher density on which the glass body is formed or treated. By thus combining the introduction of the reducing agent with the formation, or an after-treatment, of the body it is possible to produce a body having the final optical properties required within a favorably short time.

To cite an example of such a forming process, molten glass may be spread as a floating layer on a mass of material of higher density to produce flat glass having a high surface quality. More particularly, that surface of the flat glass which is formed in contact with the material on which the glass floats is of very high quality.

It is particularly advantageous to form such float glass on a material of higher density which yields reducing ions which diffuse into the glass. In that case, there is a high concentration of such reducing ions in the formed flat glass, particularly in the surface layers at that side of the flat glass which was in contact with the material of higher density. A certain quantity of reducing ions may also diffuse into the surface layers at the opposite side of the flat glass. The diffusion of the reducing ions into the glass in no way adversely affects the optical and surface qualities of such glass. It is very advantageous to introduce the reducing agent into the glass in this way because after the flat glass of the required thickness has been formed on the higher-density material, all that is required to effect the coloration is to bring the glass into contact with the treatment medium composed of a mixture of metal salts at appropriate electrical potential, under temperature conditions such that reducible silver ions diffuse into the body of glass and at least some of them are reduced by the said reducing ions.

If required, the diffusion of reducible ions into the glass may be caused to take place in the float tank. Alternatively, such diffusion may be brought about at any time after the float glass has left the float tank, e.g. after the glass has cooled.

It is also possible to treat previously formed flat glass while the glass floats on a mass of higher density material. By treating flat glass while it is floating it is possible to use very high treatment temperatures without risk of damaging the surface of the glass by contact thereof with its support. The treatments which may be carried out on floating flat glass include, for example, resurfacing treatments, i.e., treatments in which the glass is heated sufficiently, while it is in contact with the liquid support medium, to improve the flatness of its surface.

The introduction of a reducing agent into a previously formed glass body while it is floating may take place from the higher density liquid medium in the same way as when float glass is formed on such a medium. The diffusion of reducible metal ions into the body from a mixture of metal salts as required by the invention may also be brought about in the treatment tank containing such higher density liquid support medium, or such diffusion may be caused to take place subsequently.

In all processes according to the invention, the reducing agent which is introduced into the surface of the glass body preferably includes tin ions. Such reducing ions have an effective reducing power with respect to silver ions.

In certain processes according to the invention the reducing agent which is introduced into the surface of the glass body includes tin ions which diffuse into the body from a mass of molten tin. This is a very simple way of effecting diffusion of tin ions into a glass body since the body has merely to be brought into contact with molten tin. Moreover, a substantially uniform diffusion of the tin ions into any part of the surface of the body can be achieved.

Molten tin is a higher density liquid medium which is particularly advantageous for floating molten glass during formation of flat glass or for floating previously formed flat glass during treatment thereof as indicated above. However, other materials may be used for floating the glass, for example, molten lead. Lead ions may also be used as the reducing agent in a process according to the invention for reducing the reducible silver ions.

Tin and lead are not the only elements capable of reducing reducible silver ions. Examples of useful elements which may be present in the treated body are: Cu, As, Sb, Bi, S, Ce, Fe, Se, V, Cr, Mn, Mo and W.

Preferably, the concentration of reducing agent in at least one surface portion of the glass body is at least 1 percent by weight prior to the diffusion of the reducible silver ions into such surface portion. This proportion of reducing agent, although considerably higher than the proportion of reducing agent normally present in an ordinary soda-lime glass which has not undergone any chemical modification, for example soda-lime drawn sheet glass, can readily be achieved in the manner above described. When the proportion of reducing agent present in the surface layers of the body has reached the required value, it is very easy to obtain significant coloring densities even when use is made of a treatment medium which yields $Ag^+$ ions in a very small proportion with respect to the total quantity of the medium, for example less than 100 ppm.

The invention includes a glass body which has been formed and colored, or modified in color, by a process according to the invention as hereinbefore defined.

The present invention also includes colored glass bodies having a novel combination of characteristics. Thus the invention includes a glass body which, in external layers, contains at least one metal which influences the color of the body, the body being characterized in that the external layers of glass contain metallic silver and an element in oxidized form, the element having a number of states of oxidation forming at least one redox pair capable of reducing $Ag^+$ ions, in that the external layers are in a state of compression, and in that the optical characteristic of the body has an absorption peak centered on a wavelength between 405 and 435 m$\mu$ and having a width at mid-height of not more than 150 m$\mu$.

Such glass bodies according to the invention possess an important combination of advantages. The bodies have a yellow coloration which is abrasion resistant. The light-transmitting characteristics of these bodies are special and give the bodies practical importance in circumstances where it is required to screen off shortwave light without significant apparent reduction in transparency or light transmission. These bodies selectively attenuate radiation which is harmful to the eyes, including ultraviolet radiation and radiation in the blue-violet and near ultra-violet regions of the spectrum. The bodies also have the advantage, due to the fact that external layers of the glass are in a state of compression, of a relatively high mechanical strength. In the case of a body in sheet form, the compressive stresses in the surface layers give the sheet a tensile strength appreciably greater than a sheet of glass of the same composition but without such compressive stresses.

Bodies of colored glass according to the invention, in appropriate form, can be used to reduce dazzle by light from direct light sources and have the effect of increasing the apparent contrast of subjects viewed through the glass. The bodies can be used, for example, as glazing material in buildings and as screens to attenuate the dichroism of black-and-white television tubes and flurescent lighting tubes.

A particularly important potential use for bodies according to the invention is as glazing material in vehicles, e.g. automobiles. When used as such glazing material, the high mechanical strength of the colored glass combined with its specific optical characteristics as above described is particularly valuable. The glazing combines safety advantages with an anti-dazzle characteristic and improved contrast effects. It is thus possible by using such colored glass to reduce eye fatigue and even to improve vision, for example in foggy weather.

Colored glass according to the invention can moreover be provided economically, since a satisfactory coloration can be brought about with very small quantities of silver, for example less than 1 g/m$^2$.

The width of the absorption peak at mid-height is defined as follows: Starting with log I/Io ratios — in which I represents the transmission of the colored glass at a given wavelength and Io the transmission under the same conditions of an equivalent non-colored glass, a curve is plotted to represent log I/Io against the wavelength. The resulting curve has a maximum for a certain wavelength $\lambda_{max}$. The wavelength $\lambda_{1/2}$ is then determined, this wavelength being that at which the value of log I/Io is half the maximum value selected on the higher wavelength side. The width of the absorption peak at mid-height is taken as twice the difference $\lambda_{1/2} - \lambda_{max}$.

Preferably the glass body has a luminance greater than 70 percent. Such bodies afford a high level of visual acuity. This is of course of particular importance in the case of colored bodies in sheet form to be used as glazing material. Particular preference is given to bodies having a luminance greater than 80 percent.

The luminance of a glass body according to the invention is determined from 10 points of a curve plotting the percentage light transmission of the object against the wavelength of the light, which points are selected in dependance on the eye sensitivity curve as specified by the C.I.E. (Commission internationale de l'eclairage, also termed International Commission on Illumination - ICI). The luminance percentage is calculated by adding together the percentage light transmission values measured at those 10 points and dividing the resulting sum by 10. More specifically, the value of the luminance percentage is the arithmetic average of the light transmission values, expressed as a percentage of the incident light at the following ten wavelengths, in m$\mu$: 489.4; 515.1; 529.8; 541.4; 551.7; 561.9; 572.5; 584.8; 600.8; 627.1.

Preferably, a glass body according to the invention contains tin localized essentially in external layers of glass at at least one side of the body. Such glass bodies can be readily obtained starting with flat glass formed by the float process using a float bath of molten tin.

In certain embodiments of the invention, the glass body contains potassium ions in external glass layers thereof in a higher concentration than in internal layers of the glass. Such bodies have a particularly high mechanical strength, having undergone a chemical tempering treatment involving the diffusion of potassium ions into surface layers of the glass in exchange for sodium ions. Such chemical tempering in no way affects the optical properties of the glass.

In the most important products according to the invention the colored glass body is in sheet form and is colored by silver ions which are concentrated in external layers of glass at one or each side of such sheet. Such sheets of glass may be used, for example, as television tube screens, as screens for fluorescent tubes, and as glazing panels or parts of glazing panels in the building and motor vehicle industries.

One specially important application of these sheets of glass is in the production of motor vehicle windshields.

The invention includes a vehicle windshield comprising sheets of glass or at least one sheet of glass and at least one sheet of plastics, the sheet of glass or at least one of the sheets of glass being a colored glass sheet according to the present invention. The constituent sheets may be connected at their marginal portions or they may be secured together over their entire area by means of an interposed layer of adhesive material which may be glue and/or plastics.

Advantageously, the interposed layer comprises a preformed sheet such as a sheet of polyvinyl butyral.

Particular importance is attached to windshields composed of two sheets of glass, at least one of which is a colored glass sheet according to the invention, secured together by a preformed interposed sheet, for example a sheet of polyvinyl butyral. The windshields have advantageous properties conferred by the glass sheet or sheets according to the invention, including high mechanical strength, improved visual comfort, increased contrast, improved anti-dazzle effects, and a high visual acuity. The interposed plastic sheet, preferable polyvinyl butyral, contributes to the absorption of ultra-violet and near-ultra-violet radiation, due to the presence of an anti-ultra-violet stabilizer in such plastic sheet.

DESCRIPTION OF THE PREFERRED EMBODIMENTS

Figure 1:
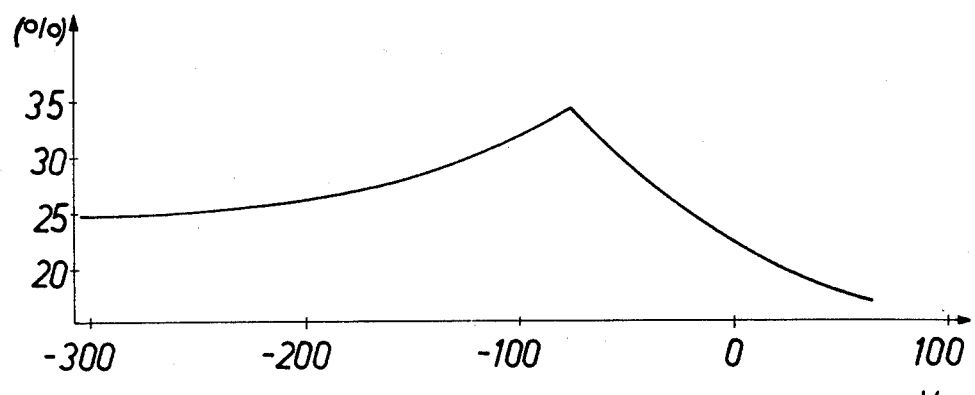
FIG. 1 is a graph used to explain the invention and showing tint purity against the potential of the treatment bath.

The following are specific examples of processes and products according to the invention with reference to the drawings.

EXAMPLE 1

Sheets of glass of a thickness of 3 mm and measuring 1 m $\times$ 0.3 m were cut from a ribbon of glass made by the float process.

The glass had the following composition:
 71 percent $SiO_2$
 1 percent $Al_2O_3$
 14 percent $Na_2O$
 9 percent CaO
 4 percent MgO
and small quantities of compounds such as $Fe_2O_3$, $SO_3$ and $K_2O$.

Since the glass had been brought into contact with molten tin during its formation, its surface layers which had been in contact with the metal bath contain reducing tin ions. The concentration of tin ions in the surface of the glass which had been in contact with the metal bath was of the order of 1 percent by weight.

The sheets of glass were preheated and then immersed in a molten salt bath consisting of $KNO_3$ to which 0.1 percent by weight of $K_2CO_3$ and 6.5 ppm of $AgNO_3$ had been added. Immersion was continued for 8 hours, while the temperature of the bath was held at 450°C. Air was blown continuously through the bath for the entire treatment period. The electrical potential of the treatment bath was monitored using a platinum electrode and a reference electrode immersed in the treatment medium.

The reference electrode consisted of a tube of borosilicate glass of the type sold under the Pyrex trademark containing a mixture of molten salts having the following composition by weight:

$K_2SO_4$ 36.1 percent $ZnSO_4$ 44.6 percent $Na_2SO_4$ 19.3 percent in which 0.1 molal $Ag_2SO_4$ was dissolved. A silver plate was immersed in this mixture of molten salts. A high input impedance millivoltmeter enabled the potential at the terminal of the platinum electrode relative to the terminal of the reference electrode to be measured. The potential of the bath as so measured was held at $-550$ mV for the entire treatment period.

When the glass sheets were withdrawn from the bath, it was found that they were colored. The sheet faces which had previously been in contact with the molten tin bath had acquired a yellow-brown coloration.

The luminance of the colored glass was calculated from 10 points selected in the transmission curve as a function of the wavelength. These points were selected as a function of the sensitivity of the eye and in accordance with the C.I.E. specifications. This luminance was greater than 80 percent.

Other sheets of glass were immersed in the same bath at the same temperature but the blowing of air through the bath was replaced by the blowing of a mixture of air and $CO_2$ in the proportion of 80 percent $CO_2$ and 20 percent air.

Under these conditions, the potential of the bath was of the order of $-250$ mV and was held at this value for the entire treatment period.

After 8 hours' immersion, the sheets were withdrawn from the bath and cooled. They had also acquired a coloration. The sheets had a luminance greater than 80 percent and a resistance to iridescence greater than that of identical untreated glass sheets.

It has been noted that it is possible, if required, to obtain a coloring at the sheet faces which were not previously in contact with the molten tin, due to the fact that a gaseous atmosphere containing a small proportion of tin in the gaseous state is present above the tin bath and is capable of diffusing reducing tin ions into the top surface layers of the floating glass.

The sheets of glass which had been subjected to the treatment in the molten salt bath were not only colored but also had a high mechanical strength due to the diffusion of $K^+$ ions from the bath into the glass in exchange for $Na^+$ ions in the glass, such exchange taking place symetrically at the two faces of the sheets.

The flexural breaking strength of the treated sheets, expressed in terms of the maximum tensile stress sustainable in the face of the sheet exposed to tensile loading due to the flexure, was of the order of 100 kg/mm². By contrast, identical glass sheets which had not been treated in the molten salt bath had a tensile strength of the order of only 7 kg/mm².

It is to be noted that on adjusting the potential of the bath to values which approach the negative limit, i.e., $-300$ mV to $-600$ mV, the resistance to iridescence becomes lower. Thus, at $-250$ mV the resistance to iridescence was of the order of 3 to 4 days, whereas at $-550$ mV, the glass showed traces of attack from the first day. The normal resistance of the glass to iridescence is about 3 days.

In comparative tests, two similar glass bodies were treated for the same period of time in separate treatment baths identical in composition with the bath above specified, the baths being at the same temperature, but the electrical potentials of the baths were uncontrolled. The two glass bodies were colored differently from one another at the end of the treatment period.

If successive batches of glass sheets are successively treated in a bath of the same composition as that above referred to, without exercising any control of the electrical potential of the bath, the optical properties of the treated glass sheets, and notably their coloration, will vary from one batch to another.

Measurement of the electrical potential of such a bath will show that the electrical potential changes in the course of time. For example, a bath agitated by air injection and having an electrical potential of the order of $-200$ mV on the first day produced yellow colored sheets. After 15 days, the electrical potential of the bath was of the order of $-400$ mV and produced a more brownish coloration of the sheets.

A treatment bath maintained in contact with $CO_2$ and having on the first day an electrical potential of about $-180$ mV showed a drop in electrical potential to about $-300$ mV towards the 15th day. Over this period of time the coloration imparted to sheets treated in the bath changed from yellow to brownish yellow.

EXAMPLE 2

Sheets of glass similar to those treated in Example 1 were preheated and immersed in a molten salt bath composed of $KNO_3$ to which 24 ppm of $AgNO_3$ had been added. The immersion lasted for 8 hours, during which time the temperature of the bath was maintained at 465°C. The electrical potential of the bath was monitored during the treatment period, in the same way as in Example 1, and adjusted to a value of $+250$ mV by passing $HNO_3$ vapors through the bath.

The sheets thus treated had, as a result of the treatment, a luminance of 80.7 percent, a color purity of 34.2 percent and a light transmission with a dominant wavelength of 571.3 m$\mu$. The term "color purity" is employed herein synonymously with "saturation of hue."

The light transmission curve of the sheets showed a minimum at a wavelength of about 415 m$\mu$ and the width of the absorption peak at mid-height was 55 to 60 m$\mu$.

These results were easily reproduced by treating further sheets in the same or another bath and by keeping the electrical potential of the bath at the specified value. This is valid for the electrical potential range $+100$ mV to $+300$ mV. In this range the treatment medium is altered rather quickly and control of the potential is therefore useful.

EXAMPLE 3

Sheets of glass identical to those treated in Example 1 were preheated and then immersed in a bath of molten salts composed of $KNO_3$ to which 24 ppm of $AgNO_3$ had been added.

The potential of the treatment medium evaluated in the same way as in Example 1 was kept at $-170$ mV by passing $CO_2$ through the bath.

The temperature of the bath was 465°C.

The glass was withdrawn from the bath after 8 hours' treatment and was then cooled. It was found that the sheets had acquired a brownish-amber coloration which was localized in the surface layers of glass at that side of the sheets which had been in contact with the molten tin.

The luminance of the glass was better than 70 percent.

The sheets of glass which had undergone the treatment in the bath of molten salts had also acquired a high mechanical strength as a result of the replacement of $Na^+$ ions in the glass by $K^+$ ions from the bath, this ion exchange having taken place symmetrically at the opposite faces of the sheets.

The flexural breaking strength of the sheets was similar to that of the sheets treated according to Example 1.

The coloration results obtained according to this example are easily reproducible. The glass sheets possessed a specific tint substantially corresponding to a light transmission curve with a dominant wavelength of 576 m$\mu$, the differences between the different sheets with respect to this optical characteristic being no more than 0.01 percent.

The resistance to iridescence of the colored sheets obtained by maintaining the potential at the value of − 170 mV was of the order of 5 to 6 days. This is better than the iridescence resistance of bodies colored by a treatment medium kept at a more negative value, e. g. below − 300 mV.

Products colored by a process in which the potential of the bath is maintained at a value between − 300 mV and + 100 mV serve particularly well as glazing materials for use in buildings.

EXAMPLE 4

Sheets of glass, identical with those treated in Example 1, were preheated and immersed in a bath of molten potassium nitrate containing 8 ppm of $AgNO_3$. The bath was maintained at a temperature of 480°C during the immersion period of the sheets, which was 8 hours.

Over the treatment period of some of the sheets the potential of the bath was maintained at − 220 mV whereas for the other sheets the potential was maintained at − 100 mV, by blowing $CO_2$ through the bath and adding to the bath a small quantity of potassium carbonate.

All the sheets thus treated were colored yellow in a reproducible manner, principally in the surface layers at the face of each sheet which had been in contact with the molten tin. The sheets treated at a bath potential of − 220 mV had a light transmission with a dominant wavelength of 570 m$\mu$, whereas the sheets treated at − 100 mV had a maximum light transmission with a dominant wavelength of 572 m$\mu$. The sheets treated at the different electrical potentials moreover had the following optical properties:

|  | Luminance | Color Purity |
| --- | --- | --- |
| − 220 mV | 82.5 % | 14 % |
| − 100 mV | 83.0 % | 23 % |

All the sheets treated had a high mechanical strength due to the replacement of $Na^+$ in the glass by $K^+$ ions from the treatment bath, the ion exchange having taken place symmetrically on the opposite faces of the sheets. The resistance of the sheets to breakage by flexure was of the same order as that of the sheets treated according to Example 1.

EXAMPLE 5

A first batch of glass sheets, identical to those treated in Example 1, were preheated and then immersed for a period of 8 hours in a bath of molten potassium nitrate containing 8 ppm of $AgNO_3$. The bath was kept at a temperature of 460°C.

The electrical potential of the bath, measured in the same way as in Example 1, was held at + 70 mV by injecting a mixture of air and $NO_2$ into the bath.

The sheets treated in this way were of a yellow color, the coloration being localized essentially in the surface layers of glass at the faces of the sheets which had been in contact with the molten tin bath.

The light transmission curve of the treated sheets had a minimum in the region between 405 m$\mu$ and 435 m$\mu$.

The treated sheets had the following further optical characteristics:

| | |
| --- | --- |
| Luminance: | 88% |
| Color purity: | 14% |
| Width of absorption peak at mid-height: | 50 m$\mu$. |

These treated sheets also had high mechanical strength due to the exchange of $Na^+$ ions of the glass with $K^+$ ions of the bath, the exchange having taken place symmetrically at the opposite faces of the sheets. The flexural breaking strength of the sheets was of the same order as that of the sheets treated according to Example 1.

The results obtained under these conditions were easily reproducible, the sheets having a precise and reproducible coloration with a light-transmission characterized by a dominant wavelength of 570 m$\mu$. The difference in the light transmission characteristics and the color purity as between the different sheets was not greater than 1 percent.

All other conditions remaining unchanged, a second bath of the glass sheets was treated using a treatment bath which was identical to the one described above except that its electrical potential was maintained at + 100 mV by periodically adding small quantities of potassium pyrosulphate to the $KNO_3$ treatment bath.

As a result of this treatment, the glass sheets were colored yellow and showed a light absorption maximum in the region 405 to 435 m$\mu$. The glass sheets also had the following optical characteristics:

| | |
| --- | --- |
| Luminance: | 88.5% |
| Color purity: | 11.0% |
| Width of absorption peak at mid-height: | 50 m$\mu$ (approx.). |

Width of absorption peak at mid-height: 50m$\mu$ (approx). The foregoing two series of results show that the products treated in the electrical potential range + 50 mV to + 100 mV possessed a luminance and a color purity of the same order.

The differences between the sheets treated in the same manner, in respect of their color purity, did not exceed 1 percent. All the products obtained had a coloration which was precise and reproducible.

In a comparative test, a third batch of the glass sheets were colored by the same process as that above described, save that the electrical potential of the bath was kept at − 200 mV by blowing a mixture of $NO_2$ and $O_2$ into the bath. The sheets thus treated possessed a color corresponding to a light transmission with a dominant wavelength of 572 mμ. The coloration was essentially localized in the surface layers of glass at the face of each sheet which had previously been in contact with the bath of molten tin. The light transmission curve of these glass sheets showed a minimum in the wavelength region between 405 mμ and 435 mμ. The colored glass sheets moreover had the following optical characteristics:

| | |
|---|---|
| Luminance: | 84% |
| Color Purity: | 9% |
| Width of the absorption peak at mid-height: | 138 mμ (approx) |

The sheets treated at this potential level of −200 mV thus possessed a luminance and a purity lower than the sheets of the first and second batches. However the disparity in the results as between different sheets subjected to the same treatment was of the same low order.

EXAMPLE 6

Three different treatments were performed on three batches of glass sheets, the treatments being similar to those of the preceding Example, all of the treatment conditions being as specified in that Example except that the treatment time was 24 hours. Thus the electrical potential of the bath in the three different treatments was maintained at + 100 mV, + 70 mV and − 200 mV, respectively.

The treated sheets were colored yellow and possessed a light absorption maximum in the region from 405 to 435 mμ.

The batches of treated glass sheets had the following optical characteristics:

| Electrical Potential | Luminance | Color Purity | Approximate width of absorption peak at mid-height |
|---|---|---|---|
| + 100 mV | 88.5 % | 12 % | 50 mμ |
| + 70 mV | 88.3 % | 14 % | 50 mμ |
| − 200 mV | 77.2 % | 25.7 % | 120 mμ |

The results of each treatment were precise and reproducible, the differences between the optical properties of different sheets subjected to the same treatment being very small. The optical characteristics of the treated sheets were comparable to those obtained in the course of a treatment which lasted for only 8 hours, i.e., a high luminance for an average color purity.

Glass treated in a treatment bath maintained at positive potential values of + 50 to + 100 mV serves particularly well in the manufacture of fluorescent lamp tubes and black and white television tubes.

EXAMPLE 7

Three batches of glass sheets identical to those treated in Example 1, were preheated and then successively immersed for 24 hours in a bath of molten potassium nitrate containing 8 ppm of AgNO₃, the bath being kept at a temperature of 465°C.

The electrical potential of the bath, measured in the same way as that described in Example 1 during the successive treatments was − 100 mV, − 75 mV and + 60 mV, respectively. The bath was brought to the required potential by injecting into the bath a gas mixture composed of NO₂ and oxygen, the relative proportions thereof being different for the different treatments.

All the sheets treated in this way were of a yellow color the coloration being mainly localized in the surface layers of glass at the sides of the sheets which had been in contact with the molten tin.

The light transmission curves of all the treated glass sheets showed a minimum in the wavelength region between 405 and 435 mμ. The width of the absorption peak at mid-height was calculated from the logarithms of the ratios of the light transmission ($I_o$) of the colorless glass to the light transmission (I) of the colored glass. These logarithms plotted against the wavelengths had a maximum for a certain maximum wavelength λ. The wavelength λ ½ was then taken at which the value of the logarithm $I_o/I$ was half the maximum value, this wavelength being selected from the band of the greatest wavelengths. The width of the peak at mid-height is equal to twice the difference λ ½ − λ maximum.

The purity of tint was also evaluated from the trichromatic coordinates on the basis of the C.I.E. diagrams.

The following table summarizes the results obtained:

| Electrical potential | Approximate width of absorption peak at mid-height | Luminance | Color Purity |
|---|---|---|---|
| − 100 mV | 75 mμ | 80.2 % | 32.0 % |
| − 75 mV | 62 mμ | 81.7 % | 34.2 % |
| + 60 mV | 50 mμ | 88.3 % | 17.5 % |

It will be seen that the tint purity passes through a maximum between − 100 mV and + 50 mV. FIG. 1, which shows that tint purity, expressed as a percentage against the electrical potential of the treatment bath, expressed in mV, clearly shows this result.

For the value of + 60 mμ, which is outside the range − 100 mV to + 50 mV, it is to be noted that the purity is poorer than at the other potentials, but on the other hand the luminance of the product is much higher.

All the sheets treated had also acquired a high mechanical strength as a result of the replacement of $Na^+$ ions in the glass by $K^+$ ions in the bath, this exchange having taken place symmetrically at the two faces of each sheet.

The flexural breaking strength of the treated sheets was of the same order of magnitude as that of the sheets treated according to Example 1.

The results obtained show only a very small variation as between different sheets subjected to the same treatment. The coloration of the sheets was predictable and reproducible. Glass colored by a process wherein the electrical potential of the bath is maintained at a value between − 100 mV and + 50 mV serves particularly well in the automobile glazing field.

EXAMPLE 8

The treatments described in the preceding Example were repeated, the only modification being that the duration of the treatment was only 8 hours.

The treated sheets were colored yellow, the coloration being mainly localized in the surface layers of glass at the face of each sheet which had been in contact with the molten tin.

The light transmission curve of the sheets possessed a minimum in the wavelength region between 405 and 435 mμ.

The optical characteristics, evaluated in the same manner as in the preceding Example were:

| Electrical potential | Approximate width of absorption peak at mid-height | Luminance | Color Purity |
|---|---|---|---|
| − 100 mV | 78 mμ | 84.6 % | 17.7 % |
| − 75 mV | 67 mμ | 85.2 % | 19.0 % |
| + 60 mV | 55 mμ | 88.6 % | 13.0 % |

As in Example 7, these tests show that the colored sheets acquire a maximum color purity at a bath potential of − 75 mV. By comparison with Example 7, it appears however that the maximum value of the color purity differs according to whether the treatment is performed for 8 hours or for 24 hours.

Thus these results show that in this range of electrical potentials reasonably high purity is obtainable while the luminance tends to decrease as the electrical potential of the treatment medium is made more negative.

EXAMPLE 9

By way of comparison with Examples 7 and 8, sheets of glass were subjected to treatments as described in those examples, with however the modification that the electrical potential of the treatment medium was brought to − 200 mV by adding to the bath a small quantity of potassium carbonate and by blowing $CO_2$ through the bath.

Different sheets were treated for 8 hours and 24 hours, respectively.

In this case the following optical characteristics were obtained:

| Time | Approximate width of absorption peak at mid-height | Luminance | Color Purity |
|---|---|---|---|
| 8 hr | 142 mμ | 84 % | 9 % |
| 24 hr | 122 mμ | 77.2 % | 25.5 % |

These last tests clearly show that for more negative potentials outside the range − 100 mV to + 50 mV, the luminances of the resulting products are at a lower level.

As in the case of Examples 7 and 8, the results obtained according to the present example showed only a small variation, as between different sheets, the tinting of the glass being precise and reproducible.

EXAMPLE 10

Batches of glass sheets identical to those treated in Example 1 were preheated and then immersed in a bath of molten salt composed of $KNO_3$ and containing 24 ppm of $AgNO_3$.

The temperature of the bath was 465°C and the immersion of the sheets in the bath was continued for 8 hours.

One batch of the sheets was treated with the bath potential, evaluated as described in Example 1, maintained at − 330 mV by adding a small quantity of potassium carbonate to the bath and blowing $CO_2$ through the bath.

Another batch of the sheets was treated while the bath potential was kept at + 40 mV by injecting a mixture of air and $SO_2$ into the bath.

The first batch of sheets acquired a brownish color as a result of this treatment, while the second batch of sheets acquired a bright yellow tint which was mainly localized in the surface layers of glass at the face of each sheet which had previously been in contact with the molten tin.

The luminance of the treated glass sheets of the first batch was of the order of 72 percent and the luminance of the treated glass sheets of the second batch was of the order of 81 percent.

Figure 2:
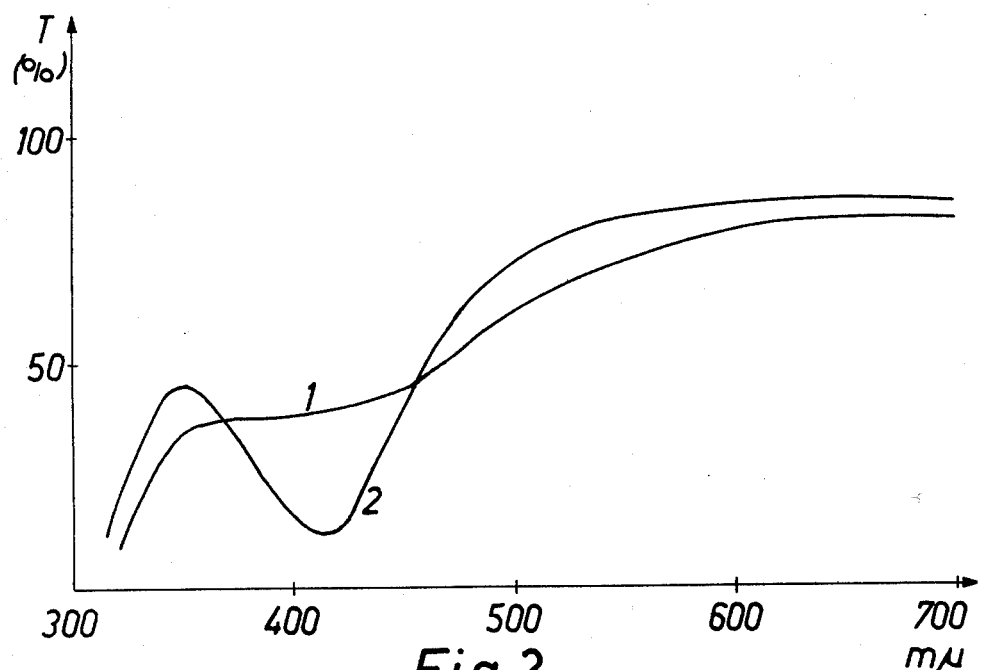
FIG. 2 is a graph showing the light transmission of sheets according to the invention plotted against the wavelength.

FIG. 2 shows the light transmission, expressed as percentages, of the sheets treated according to this example plotted against the wavelength, expressed in mμ. Curve 1 relates to the sheets treated at + 330 mV. Curve 2 relates to the sheets treated at + 40 mV. Curve 2 shows a light transmission minimum in the wavelength region between 405 and 435 mμ.

All the treated glass sheets acquired a high mechanical strength as a result of the replacement of $Na^+$ ions in the glass by $K^+$ ions in the bath, this exchange having taken place symmetrically at the opposed faces of the sheets.

The flexural breaking strength of the treated sheets was similar to that of the sheets treated as described in Example 1.

Tests showed that the procedure according to this example resulted in a particular and reproducible tinting of the glass. The sheets treated at a potential of + 40 mV had a light transmission corresponding to a dominant wavelength of 573 mμ whereas the sheets treated at − 330 mV had a light transmission corresponding to a dominant wavelength of 576 mμ. The color purity of the products obtained was 32.4 percent at + 40 mV and 25 percent at − 330 mV and insofar as this optical property is concerned the differences in the results as between different sheets treated in the same manner did not exceed 1 percent.

It was noted that the sheets treated at a bath potential of + 40 mV possessed a color purity and a luminance higher than the sheets treated at − 330 mV.

EXAMPLE 11

A sheet of glass 2.8 mm thick was cut from a ribbon of glass made by the float process. This glass was made of (in percent by weight) $SiO_2$ 72.3 percent, $Al_2O_3$ 1.00 percent, $Fe_2O_3$ 0.07 percent, $Na_2O$ 14 percent, $MgO$ 3.7 percent and $SO_3$ 0.25 percent. This sheet was treated for 8 hours in a bath of molten $KNO_3$ heated to 465°C. The bath of $KNO_3$ contained about 12 ppm of $AgNO_3$.

The potential of the bath, evaluated in the same way as in Example 1, was held at + 40 mV by blowing a mixture of oxygen and $NO_2$ through the bath.

As a result of such treatment, the sheet acquired a yellow coloration localized in the surface layers of glass at the face of the sheet which had been in contact with the molten tin. The mechanical strength of the treated sheet was similar to that of the sheets treated according to Example 1.

The representing curve of the light transmission of this colored glass sheet as a function of the light wavelength showed a minimum light transmission in the region between 405 and 435 mμ.

The colored sheet of glass was then connected to another thinner and untinted sheet of glass by means of an intervening thin sheet of polyvinyl butyral.

Evaluation of the trichromatic coordinates of this assembly from the light transmission versus wavelength curve enabled the following data to be established on the basis of the C.I.E. diagram:

| Dominant transmitted light wavelength: | 570 mμ |
| --- | --- |
| Color Purity: | 18% |
| Luminance: | 84% |

The result achieved in this example was reproducible with a low value of deviation. The glass sheet had a yellow color characterized by a light transmission with a dominant wavelength 570 mμ.

A similar process was performed wherein all treatment conditions were the same as before except that the electrical potential of the treatment bath was maintained at a value of − 250 mV by the addition of potassium carbonate and blowing $CO_2$ through the treatment medium. In this case the treated glass sheet had the following optical characteristics:

| Dominant transmitted light wavelength: | 573 mμ |
| --- | --- |
| Color Purity: | 10.5% |
| Luminance: | 79.0% |

Comparison of the results obtained at the two different electrical potential levels, namely + 40 mV and − 250 mV, clearly shows that the values of the color purity and the luminance decrease as the electrical potential of the treatment medium is made more negative.

EXAMPLE 12

Sheets of glass 3 mm in thickness were cut from a glass ribbon manufactured by the float process using a bath of molten tin.

The composition of this type of glass was the same as in Example 11. The glass was treated for 8 hours in a bath of molten $KNO_3$ at a temperature of 465°C. The bath of $KNO_3$ contained about 16 ppm of $AgNo_3$. The electrical potential of the bath was measured in the same manner as in Example 1 using a platinum electrode and a reference electrode and the value of the electrical potential was brought a. in a first test to a value between 0 and 20 mV and
  b. in another test to about − 300 mV.

After these treatments the sheets were found to have acquired on the one hand a yellow coloration localized principally at the face which had been in contact with molten tin in the float bath, and on the other hand a high mechanical strength.

The light transmission versus wavelength curves of the glass sheets were similar to the curves shown in FIG. 2 which pertains to the glass sheets treated according to Example 10.

In test a), the light transmission versus wavelength curve of the sheets shows a minimum light transmission in the wavelength region from 405 to 435 mμ.

The width of the absorption peak at mid-height, as calculated in Example 7, was 34 mμ.

The trichromatic coordinates derived from the light transmission versus wavelength curve enabled the following characteristics of the glass sheets to be determined:

|  |  | a) | b) |
| --- | --- | --- | --- |
| 1) | dominant transmitted light wavelength | 569.5 mμ | 573 mμ |
| 2) | color purity | 14.6 % | 10.75 % |
| 3) | luminance | 88.17 % | 82.8 % |

The colored sheets possessed a color characteristic corresponding to the dominant wavelengths identified in the preceding table; these reproducible results showed a very small deviation.

Moreover, the results show that the luminance decreases outside the potential range − 100 mV to + 50 mV and that the color purity is better in this range.

EXAMPLE 13

Sheets of glass similar to those described in Example 12 were treated in the same manner in a bath containing 55 percent by weight of $KNO_3$ and 45 percent by weight of $NaNO_3$, to which bath 16 ppm of $AgNO_3$ had been added.

Figure 3:
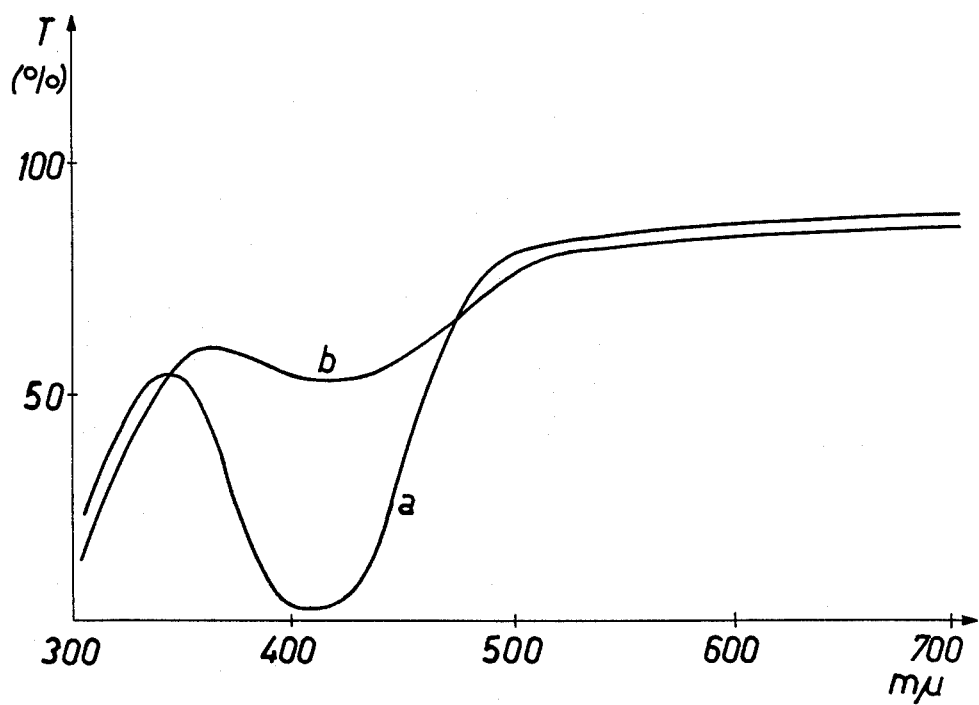
FIG. 3 is also a light transmission versus wavelength curves of colored glass sheets according to the invention.

The electrical potential of the bath was measured and was maintained in first and second tests a) and b) at the same values as in Example 12. The light transmission versus wavelength curves of the colored glass sheets are shown in FIG. 3. The curve (a) which pertains to the sheets treated under conditions a) exhibits a minimum in the wavelength region from 390 mμ to 420 mμ.

The width of the absorption peak at mid-height, calculated as in Example 7, was 20 mμ.

The treated sheets had the following optical characteristics:

|  | a) | b) |
| --- | --- | --- |
| dominant transmitted light wavelength | 570.5 mμ | 571.6 mμ |
| color purity | 28.3 % | 14.9 % |
| luminance | 85.42 % | 82.1 % |

The deviation in the results with respect to the wavelengths at which the absorption peak is centered, was small, of the order of 0.01 percent.

Moreover, when utilizing this different treatment bath, the luminance values of the treated sheets likewise decrease when one departs from the range of potentials of − 100 mV to + 50 mV and the color purity is better in that potential range.

EXAMPLE 14

Sheets of glass similar to those described in Example 12 were treated in the same manner in a bath containing $NaNO_3$ and 16 ppm of $AgNO_3$. The electrical potential of the bath was measured and was maintained in first and second tests a) and b) at the same values as in Example 12.

In the conditions a), the light absorption peak of the light transmission versus wavelength curve of the colored sheets was still greater.

The width of the absorption peak at mid-height, calculated as in Example 7, was smaller than 20 mμ.

The treated sheets had the following characteristics, derived from the trichromatic coordinates:

|  | a) | b) |
| --- | --- | --- |
| dominant transmitted light wavelength | 570 mμ | 572.4 mμ |
| color purity | 40 % | 12 % |
| luminance | 84.6 % | 85 % |

The deviation in the results obtained was small. Moreover, in the present conditions, where the treatment bath was different, the luminance of the product decreases when one departs from the potential range of − 100 mV to + 50 mV, while the purity is better and is in fact excellent when working in that potential range.

EXAMPLE 15

Sheets of glass having the following composition by weight:

| | |
|---|---|
| 72.5% | $SiO_2$ |
| 1.5% | $Al_2O_3$ |
| 14.0% | $Na_2O$ |
| 7.5% | CaO |
| 4.0% | MgO | and including small quantities of compounds such as $K_2O$, $Fe_2O_3$ and $SO_3$, were subjected to treatments identical to those described in all of the foregoing examples. Prior to the coloring treatment these sheets of glass were heated to 800°C and brought into contact with a molten Sn - Sb alloy (50:50 by weight).

On contact of the glass with the alloy, tin and antimony in ionic form penetrated into the glass so that the glass surfaces which were in contact with the alloy contained reducing ions.

The results obtained in the subsequent coloring treatments were substantially similar to those obtained in the corresponding foregoing examples.

EXAMPLE 16

Sheets of glass identical with those treated in Example 1 were preheated and immersed in different treatment baths. A first series of sheets was immersed for 24 hours in a bath of $KNO_3$ containing 3 ppm of $AgNO_3$ maintained at 480°C during the treatment. The potential of this bath was maintained at − 300 mV by injecting $CO_2$ therein.

A second series of sheets were treated for 8 hours in a bath of $KNO_3$, to which 8 ppm of $AgNO_3$ had been added, the bath being maintained at 465°C and at a potential of − 75 mV, during the treatment.

The two series of treated sheets possessed the same resistance to breakage by flexure as the sheets treated according to Example 1. Moreover, the sheets had the following optical characteristics:
1. a coloration, principally localized at the face which had been in contact with molten tin, corresponding to a light transmission with a dominant wavelength of 570 mµ
2. a luminance of 85 percent
3. a color purity of 18.5 percent.

From these tests, it appears that, provided the electrical potential of the treatment medium is correctly chosen, it is possible to achieve similar results in different processes notwithstanding that there are differences in the other main treatment conditions, namely the temperature, the composition of the treatment medium and the duration of the treatment.

EXAMPLE 17

Sheets of glass identical to those treated in Example 1 were preheated and immersed in different treatment baths. A first series of sheets was immersed for 24 hours in a bath of $KNO_3$ containing 8 ppm of $AgNO_3$. The temperature of the bath was maintained during the treatment at 465°C, and the electrical potential was kept at − 200 mV by injecting $CO_2$ into the bath. A second series of sheets was treated for 8 hours in a bath of $KNO_3$ containing 24 ppm of $AgNO_3$ and at 465°C. The electrical potential of the bath for this second series of sheets was + 50 mV.

The colored sheets of both series possessed a resistance to breakage by flexure of the same order as those treated according to Example 1, and had the following optical characteristics:
1. a coloration, principally localized at the face which had been in contact with molten tin, corresponding to a light transmission with a dominant wavelength of 574 mµ
2. a luminance of 73.8 percent
3. a color purity of 32.4 percent These results show again that it is possible to obtain similar results by treating glass in baths under different treatment conditions provided that the electrical potential of the treatment medium is appropriately chosen in each case.

It will be understood that the above description of the present invention is susceptible to various modifications, changes and adaptations, and the same are intended to be comprehended within the meaning and range of equivalents of the appended claims.

We claim:

1. In a process of forming a glass body from a vitrifiable batch and modifying the color of such body by causing a substance to diffuse into surface layers of the glass body from a contacting treatment medium, the improvement comprising: introducing a reducing agent into the surface of the body; providing a treatment medium composed of at least one salt yielding reducible silver ions capable of being reduced by the reducing agent, and a diluting agent constituted by one or more salts of a metal other than silver; introducing into the medium a substance which influences the electrical potential of the medium to bring such potential to a selected value in the range between −600 and +300 mV relative to a reference potential; monitoring the value of the electrical potential of the medium; varying the concentration of such substance in the medium, whenever the potential value measured during said monitoring step deviates from said selected value, in a direction to return the value of the reference potential to said selected value; contacting the body into which such reducing agent has been introduced with such medium for a predetermined time while maintaining the electrical potential of said medium in such range and while maintaining temperature conditions such that reducible silver ions diffuse from the medium into the body and at least some of such ions are reduced in the body by the reducing agent.

2. A process according to claim 1 wherein the electrical potential of the treatment medium is in the range of −300 to +100 mV during the treatment of the body.

3. A process according to claim 1 wherein the electrical potential of the treatment medium is in the range of −100 to +50 mV during the treatment of the body.

4. A process according to claim 1 wherein the electrical potential of the treatment medium is in the range of +50 to +100 mV during the treatment of the body.

5. A process according to claim 1 wherein the treatment medium is composed substantially entirely of molten salts.

6. A process according to claim 1 wherein the salt comprises at least one silver compound with the total silver compound concentration being less than 100 parts per million.

7. A process according to claim 1 wherein the diluting agent comprises a substance yielding metal ions and said temperature conditions are maintained such that these metal ions diffuse into the body in exchange for smaller ions and this causes surface compressive stresses to be induced into the body, which stresses at least in part remain at the end of the treatment.

8. A process according to claim 7 wherein the diluting agent yields potassium ions which diffuse into the body in exchange for sodium ions.

9. A process according to claim 8 wherein the diluting agent is at least predominantly composed of potassium nitrate and the remainder of the treatment medium is at least predominantly composed of silver nitrate.

10. A process according to claim 7 wherein said steps of giving the medium an electrical potential and maintaining the electrical potential are carried out so that at the completion of the treatment which brings about coloration of the body by silver, the optical characteristic of the body has an absorption band which is centered on a wavelength between 405 and 435 m$\mu$ and has a width at mid-height of not more than 150 m$\mu$.

11. A process according to claim 10 wherein said steps of giving the medium an electrical potential and maintaining the electrical potential are carried out, and the predetermined time is selected, such that at the end of said treatment the body has a luminance greater than 70 percent.

12. A process according to claim 1 wherein the treatment medium contains a carbonate.

13. A process according to claim 1 comprising the further step of, during the treatment of the body, bringing at least one of the gases in the group consisting of $CO_2$, $SO_2$, $NO_2$ and nitric acid vapors into contact with the treatment medium.

14. A process according to claim 13 wherein said step of bringing comprises bringing oxygen together with such gas into contact with the treatment medium.

15. A process according to claim 1 wherein said step of introducing a reducing agent comprises causing reducing agent to diffuse into the glass body from a mass of material of higher density on which the body is supported.

16. A process according to claim 1 wherein the reducing agent which is introduced into the surface of the glass body comprises tin ions.

17. A process according to claim 16 wherein said step of introducing a reducing agent comprises causing the tin ions to diffuse into the body from a mass of molten tin.

18. A process according to claim 1 wherein said step of introducing a reducing agent is carried out to cause the concentration in at least one surface portion of the glass body to be at least 1 percent by weight prior to said step of contacting and the resulting diffusion of the reducible metal ions into such surface portion.

* * * * *

UNITED STATES PATENT OFFICE
CERTIFICATE OF CORRECTION

PATENT NO. : 3,905,791

DATED : September 16th, 1975

INVENTOR(S) : Emile Plumat et al

It is certified that error appears in the above-identified patent and that said Letters Patent are hereby corrected as shown below:

Column 5, line 10, change "by" to --By--.

Column 6, line 9, change "million." to --million).--

Column 10, line 7, change "meduim" to --medium--; line 53, change "flurescent" to --fluorescent--.

Column 11, line 2, change "log I/Io to --log Io/I--; line 6, change "log I/Io" to --log Io/I--; line 10, change "log I/Io" to --log Io/I--.

Column 13, line 3, change "$K_2SOhd4$" to --$K_2SO_4$--.

Column 25, line 3, change "into" to --in--.

Signed and Sealed this ninth Day of March 1976

[SEAL]

Attest:

RUTH C. MASON
Attesting Officer

C. MARSHALL DANN
Commissioner of Patents and Trademarks